United States Patent
Huessy et al.

(10) Patent No.: US 10,697,574 B2
(45) Date of Patent: Jun. 30, 2020

(54) HEATING ELEMENT GEOMETRY FOR USE IN A TAPPING SADDLE

(71) Applicant: Georg Fischer Wavin AG, Schaffhausen (CH)

(72) Inventors: Jonas Huessy, Neunkirch (CH); Dirk Petry, Feuerthalen (CH); Edwin Habluetzel, Schaffhausen (CH)

(73) Assignee: GEORG FISCHER WAVIN AG, Schaffhausen (CH)

( * ) Notice: Subject to any disclaimer, the term of this patent is extended or adjusted under 35 U.S.C. 154(b) by 113 days.

(21) Appl. No.: 15/956,785

(22) Filed: Apr. 19, 2018

(65) Prior Publication Data

US 2018/0306366 A1    Oct. 25, 2018

(30) Foreign Application Priority Data

Apr. 20, 2017  (EP) .................................. 17167392

(51) Int. Cl.
*F16L 47/26* (2006.01)
*F16L 47/34* (2006.01)
(Continued)

(52) U.S. Cl.
CPC .......... *F16L 47/345* (2013.01); *B29C 65/342* (2013.01); *B29C 65/3424* (2013.01); *B29C 65/3428* (2013.01); *B29C 66/112* (2013.01); *B29C 66/131* (2013.01); *B29C 66/5225* (2013.01); *B29C 66/53247* (2013.01);
(Continued)

(58) Field of Classification Search
CPC ......... F16L 47/345; F16L 47/26; F16L 47/34; F16L 47/03; F16L 47/30; B29C 2793/009; B29C 2793/0018; B29C 66/5225; B29C 66/131; B29C 66/112; B29C 65/3428; B29C 65/342; B29C 66/5229; B29C 66/52241; B29C 66/1122; B29C 65/3476
See application file for complete search history.

(56) References Cited

U.S. PATENT DOCUMENTS 1,905,770 A * 4/1933 Walker ..................... H05B 3/16
                                                          219/461.1
3,954,541 A * 5/1976 Landgraf .......... B29C 66/52241
                                                          156/274.2
(Continued)

FOREIGN PATENT DOCUMENTS

CH          687413  A5    11/1996
CN        105299372  A     2/2016
(Continued)

*Primary Examiner* — Matthew W Jellett
*Assistant Examiner* — Christopher D Ballman
(74) *Attorney, Agent, or Firm* — Leydig, Voit & Mayer, Ltd.

(57) ABSTRACT

A tapping saddle for a plastic main pipe carrying a medium includes a stub having a central axis, a saddle piece, and a drill. The drill is configured to be moved axially in the stub. A heating element geometry, which is used for welding the tapping saddle to a main tube outer circumference, is arranged on an inside diameter of the saddle piece. The heating element geometry has a winding having an outer winding region and an inner winding region. In the inner winding region, the winding extends in meandering loops along a circle concentric with the central axis of the stub.

19 Claims, 5 Drawing Sheets

(51) Int. Cl.
  *B29C 65/00* (2006.01)
  *B29C 65/34* (2006.01)
  *F16L 47/03* (2006.01)
  *F16L 47/30* (2006.01)
  *B29L 23/00* (2006.01)

(52) U.S. Cl.
  CPC .............. *B29C 66/71* (2013.01); *F16L 47/03* (2013.01); *F16L 47/26* (2013.01); *F16L 47/34* (2013.01); *B29C 65/3476* (2013.01); *B29C 66/1122* (2013.01); *B29C 66/5229* (2013.01); *B29C 66/52241* (2013.01); *B29C 2793/009* (2013.01); *B29C 2793/0018* (2013.01); *B29L 2023/22* (2013.01); *F16L 47/30* (2013.01)

(56) References Cited

U.S. PATENT DOCUMENTS

| | | | | |
|---|---|---|---|---|
| 4,040,889 A * | 8/1977 | Acda | ................. | B29C 45/14639 156/498 |
| 4,436,987 A * | 3/1984 | Thalmann | ......... | B29C 66/52241 156/274.2 |
| 4,655,480 A * | 4/1987 | Thalmann | ............. | B29C 65/342 137/318 |
| 4,675,509 A * | 6/1987 | Hell | ........................ | B29C 65/18 219/486 |
| 4,684,417 A * | 8/1987 | Grandclement | ...... | B29C 65/342 156/64 |
| 4,687,894 A * | 8/1987 | Koga | ........................ | C21D 1/42 219/611 |
| 4,836,586 A * | 6/1989 | Martin | ................ | B29C 61/0608 285/381.3 |
| 4,894,521 A * | 1/1990 | Evans | ................... | B29C 65/342 219/535 |
| 4,903,397 A * | 2/1990 | Freidel | ............. | B29C 45/14549 219/544 |
| 5,141,580 A * | 8/1992 | Dufour | ............. | B29C 66/52241 156/158 |
| 5,352,871 A * | 10/1994 | Ross | ................... | B29C 65/3668 156/272.4 |
| 5,410,131 A | 4/1995 | Brunet et al. | | |
| 5,475,203 A * | 12/1995 | McGaffigan | .......... | B29C 65/344 219/545 |
| 5,624,750 A * | 4/1997 | Martinez | .................... | C09J 5/06 156/273.9 |
| 5,793,017 A * | 8/1998 | Yamada | ........... | B29C 66/73921 219/221 |
| 5,896,885 A * | 4/1999 | Svetlik | .................... | F16L 41/04 137/15.14 |
| 6,193,834 B1 * | 2/2001 | Smith | ................. | B29C 66/1224 156/273.9 |
| 6,274,073 B1 * | 8/2001 | Schafstein | ........ | B29C 45/14549 219/535 |
| 6,331,698 B1 * | 12/2001 | Hintzen | ................ | B29C 65/342 156/304.2 |
| 8,201,573 B2 * | 6/2012 | Christodoulou | ........ | F16L 47/03 137/15.12 |
| 9,307,686 B2 * | 4/2016 | Takada | ................. | H05K 1/0212 |
| 2004/0035840 A1 * | 2/2004 | Koopmans | ............ | H01L 23/345 219/209 |
| 2006/0090425 A1 * | 5/2006 | Fenn | ....................... | B29C 65/18 53/453 |
| 2006/0096251 A1 * | 5/2006 | Donges | .................. | B29C 51/42 53/453 |
| 2007/0252383 A1 | 11/2007 | Tappe | | |
| 2009/0256349 A1 * | 10/2009 | Strubin | ............... | B29C 45/1459 285/21.2 |
| 2013/0285366 A1 * | 10/2013 | Tailor | ................. | B29C 65/3668 285/21.2 |
| 2013/0341320 A1 * | 12/2013 | Tailor | ................. | F16L 13/0272 219/643 |
| 2017/0015053 A1 * | 1/2017 | Kim | ....................... | B29C 65/04 |

FOREIGN PATENT DOCUMENTS

| | | |
|---|---|---|
| DE | 3939570 A1 | 6/1991 |
| DE | 19510963 A1 | 9/1996 |
| DE | 102004023338 A1 | 12/2005 |
| EP | 0565397 A1 | 10/1993 |
| EP | 2048426 A2 | 4/2009 |
| JP | 2004286180 A | 10/2004 |
| JP | 5832248 B2 | 12/2015 |
| WO | WO 2005106313 A1 | 11/2005 |

* cited by examiner

Prior Art

HEATING ELEMENT GEOMETRY FOR USE IN A TAPPING SADDLE

CROSS REFERENCE TO RELATED APPLICATIONS

This application claims benefit to European Patent Application No. 17 167 392.4, filed Apr. 20, 2017, which is incorporated by reference herein.

FIELD

The present invention pertains to tapping saddles for a pipe carrying a medium, and particularly to the geometry of heating elements for such tapping saddles.

BACKGROUND

Tapping saddles and also pipe tapping fittings are known from the prior art and are used to connect a branch line to a main pipe. EP 0 679 831 A2 discloses a shaped connecting part for producing branch connections, wherein the heating element used therein has a winding carrier in which the resistance wire is placed in the grooves provided in the winding carrier, and the winding carrier is then embedded in the material of the shaped connecting part.

This embodiment has the disadvantage that a cold zone due to the absence of the resistance wire is formed at the transition to the saddle piece inside diameter in the region of the inside diameter of the pipe stub and this cold zone counts as a weak point in the case of long-term pressure conditions since the pressure of the medium exerts a force on the saddle which leads to the saddle peeling off from the pipe.

In order to provide a remedy, there are versions which reduce the cold zone as far as possible and thereby bring the welding zone closer to the inside diameter of the stub, but this entails the disadvantage that these versions tend to the unwanted emergence of wire and molten material.

EP 0 565 397 A1 discloses a method for producing a heating resistor for welding plastic parts. The heating resistors are produced as grids or, alternatively, as grids in the form of a cylindrical pipe section and are then converted by compressing the cylindrical shape into a flattened collar shape. The disadvantage here is that the heating resistor is not fixed on a support material and therefore the wire undergoes an unwanted relative displacement and wire tends to emerge from the plastic part.

CN 105299372A and JP 5832248 likewise disclose heating windings for tapping saddles which have a special winding pattern. However, the disadvantage with these is that they have a large cold zone in the central region and, as already mentioned, this forms a weak point and the joint readily comes apart there.

SUMMARY

In an embodiment, the present invention provides a tapping saddle for a plastic main pipe carrying a medium. The tapping saddle includes a stub having a central axis; a saddle piece; and a drill. The drill is configured to be moved axially in the stub. A heating element geometry, which is used for welding the tapping saddle to a main tube outer circumference, is arranged on an inside diameter of the saddle piece. The heating element geometry has a winding having an outer winding region and an inner winding region. In the inner winding region, the winding extends in meandering loops along a circle concentric with the central axis of the stub.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

One or more embodiments of the invention provide a tapping saddle, a method for tapping, and a corresponding heating element geometry that reduces or eliminates the cold zone in the centre or directly adjoining the drilled hole without wire or molten material emerging that would result in weakening of the weld.

One or more embodiments of the invention provide a heating element geometry having a winding, preferably made of wire, wherein the winding has an outer winding region and an inner winding region, wherein the winding of the inner winding region extends in meandering loops along a circle concentric with the central axis of the stub. The winding is preferably arranged on a support material.

The meandering loops project into the inside diameter of the stub, and are embedded in the saddle piece. The loops project so far into the region of the stub that the drill severs the meandering heating element region during tapping. As a result, the welded region extends as far as the drilled hole. Of course, the welding process has been carried out before tapping to ensure that the inner winding region or the inner turns of the winding have not yet been severed during the welding process.

A tapping saddle according to one or more embodiments of the invention for a plastic main pipe carrying a medium comprises a stub, preferably with an internal thread, which is used for the forward feed of the drill, but the stub can also be embodied without a thread and can be tapped by means of an external tool or drill, for example.

The tapping saddle can also have a stub, to which a further stub can be adapted, said further stub having an internal thread and a drill with a corresponding external thread, this then corresponding to a tapping saddle with an adaptable tapping T.

The stub has a central axis, which also corresponds to the central axis of the drill. The tapping saddle furthermore has a saddle piece, wherein the inside diameter of the saddle piece has arranged on it a heating element geometry, which is used for welding to the main pipe. The drill, which is preferably arranged in the stub, has an external thread, which corresponds to the internal thread in the stub and thereby enables the drill to be moved axially. As already mentioned above, tapping of the tapping saddle is also possible by means of an external drill.

The heating element geometry preferably has a support material and a winding. The support material is preferably produced from polyethylene. The winding is formed by a wire, which is correspondingly wound. The wire is preferably secured on the support material by stitching, by being pressed in or by being wound around studs, but it can also be ploughed in, thus also making it possible to dispense with a support material by ploughing the winding directly into the saddle piece. The winding has an inner region and an outer region, wherein the inner winding region extends in meandering loops along a circle concentric with the central axis of the stub. The distances between the individual loops and the central axis are identical in each case.

The meandering loops preferably have radially extending winding sections or winding sections extending radially away from the central axis, which are arranged in series along a circle arranged concentrically with the central axis and are connected to one another by arcs, preferably radii. The inner arcs or radii of the meandering loops are preferably all at the same distance from the central axis. This arrangement of the inner winding region serves to eliminate the inner cold zone in the tapped state. The meandering loops, which are embedded in the closed saddle piece, project into the region of the cavity of the stub, with the result that, as the saddle piece is drilled, not only does the drill pass through the plastic of the saddle piece but also drills through the inner winding and cuts off the meandering loops. It is thereby possible to avoid an inner cold zone directly adjoining the stub. Instead, the inner winding directly adjoins the stub. Welding takes place before drilling and, by virtue of the arrangement without a cold zone in the centre, ensures a good connection between the saddle piece and the main pipe without the emergence of wire or molten material occurring. Moreover, it is possible to avoid the detachment of the saddle piece from the main pipe in the inner region by virtue of the absence of a cold zone.

The outer winding is preferably arranged around the inner winding and is preferably formed from the same wire. A spiral or meandering or even polygonal arrangement have proven to be preferred embodiments of the outer winding.

In an advantageous embodiment, the drill severs the inner winding region or the meandering loops as it taps the main pipe and the saddle piece, thereby making it possible for there to be no cold zone directly adjoining the stub in the inner region of the saddle piece directly adjoining the stub, as a result of which the unwanted effect of detachment of the saddle piece from the main pipe can be avoided.

It is advantageous if the cutting edge of the drill severs the meandering loops in the region of the winding sections. This cutting point prevents the wire from catching in the drill and thus also prevents the wire from being torn out.

It has furthermore proven advantageous that the winding sections of the meandering inner winding region are oriented at right angles to the cutting edge of the drill or of the cut edge formed in the saddle piece. This avoids the wire catching in an unwanted manner in the drill, as already mentioned.

The outer winding region of the winding can extend in a spiral shape, polygonal shape or meandering shape, although other arrangements are also conceivable.

The winding is preferably formed by a continuous wire without interruptions or joints.

The heating element geometry according to one or more embodiments of the invention is employed as a heating element for use in a tapping saddle. The heating element geometry is arranged on the inside diameter of the saddle piece and is used for welding the tapping saddle to the main pipe. The heating element geometry has a winding, wherein the winding is preferably formed from a wire. A preferred embodiment has proven to be one where the heating element geometry has a support material. The support material is preferably produced from the same material as the saddle piece, e.g. polyethylene. The winding has an inner and an outer region, wherein the winding of the inner winding region extends in meandering loops along a circle concentric with the central axis of the stub. The meandering loops preferably have radially extending winding sections which are arranged in series along a circle arranged concentrically with the central axis and are connected to one another by arcs, preferably radii.

To secure the fastening of the winding on the support material and avoid displacement of the wire, it is advantageous if the winding is stitched firmly to the support material, wherein the firm stitching nevertheless enables the wire to expand when heated, and other types of fastening are also conceivable.

The winding preferably has a meandering arrangement of the wire in the inner winding region and a spiral, meandering or even polygonal arrangement of the wire in the outer winding region.

A method according to one or more embodiments of the invention for tapping a plastic main pipe carrying a medium comprises the following steps: positioning a tapping saddle on the outer circumference of the main pipe, welding the tapping saddle to the outer circumference of the main pipe, wherein the welding is carried out by heating the heating element geometry, drilling through the saddle piece of the tapping saddle and tapping the main pipe, wherein tapping takes place through the heating element geometry arranged in the saddle case, wherein drilling is preferably through the inner winding region, and the wire is severed. Drilling can be carried out by means of an external drill or, alternatively, by means of a drill arranged in the stub.

Figure 1:
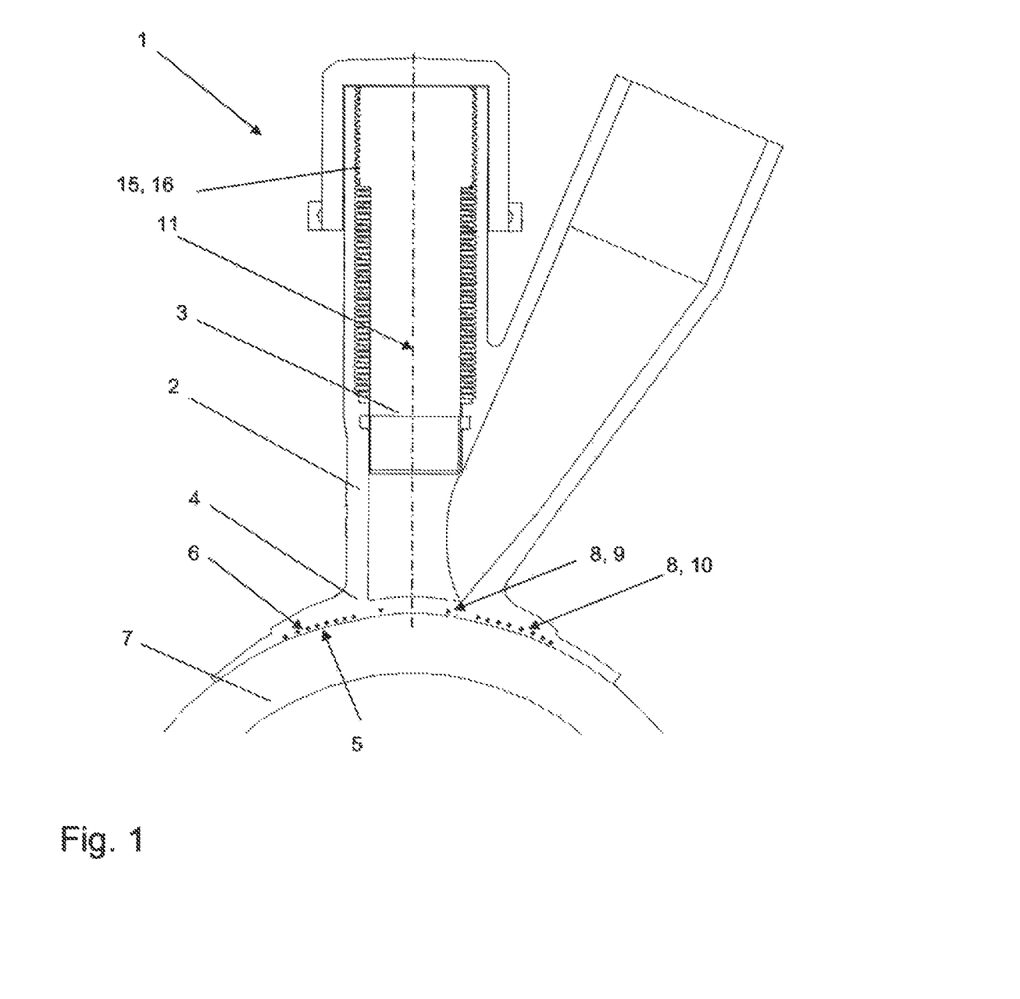
FIG. 1 shows a section through a tapping saddle according to an embodiment of the invention.

The drawing shown in FIG. 1 shows a section through a tapping saddle 1 according to an embodiment the invention for a plastic main pipe carrying a medium. The tapping saddle 1 comprises a stub 2 having a central axis 11, in which a drill 3 is arranged, wherein the tapping saddle 1 can also have a stub to which a further stub containing the drill can be adapted or can have a tapping T which can be secured on the tapping drill 1. Of course, an external drill, by means of which the tapping saddle can be drilled, is also conceivable, although this embodiment is not depicted. The drill 3 preferably has an external thread 16, which corresponds to the internal thread 15 in the stub 2 and by means of which the drill 3 can be adjusted axially. The tapping saddle 1 has a saddle piece 4, which is arranged on the main pipe 7. Arranged in the inside diameter 5 of the saddle piece 4 is a heating element geometry 6, which is used for welding the tapping saddle 1 to the main pipe 7. In the embodiment illustrated in FIG. 1, tapping has not yet been carried out since, as is still apparent, the saddle piece 4 does not yet have an open passage to the stub 2. As a result, it is also readily apparent that the wire of the winding 8 or of the inner winding region 9 extends into the inner region of the stub 2. During the tapping of the welded saddle piece 4 and of the main pipe 7, the inner winding region 9, which is of meandering design, is then drilled through, as a result of which the winding 8 of the heating element geometry 6 or the welded zone 18 extends as far as the cylindrical opening formed by the tapping operation and thereby ensures that no cold zone is formed in the interior.

Figure 2:
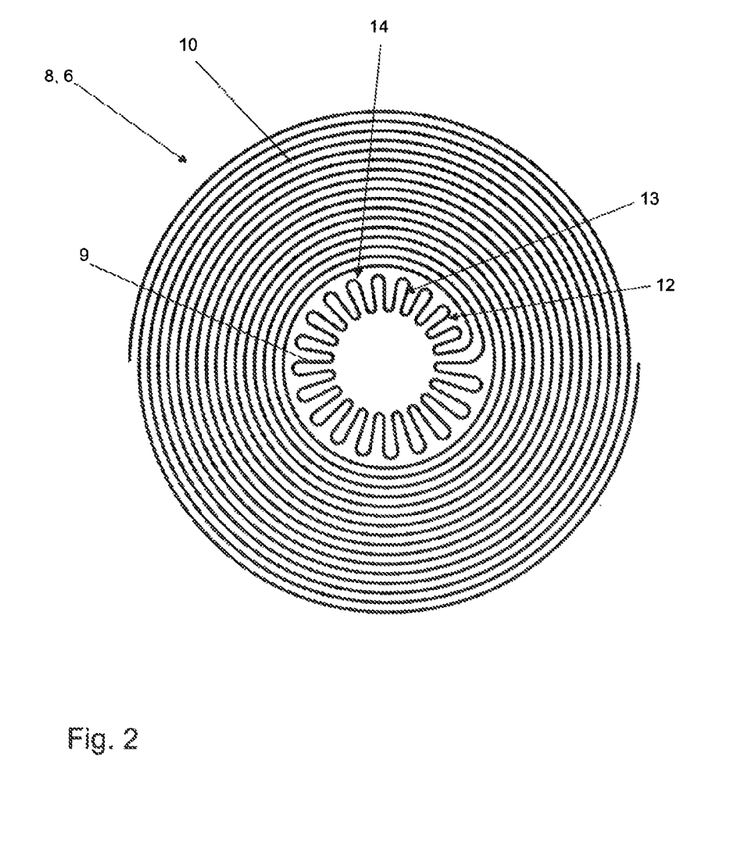
FIG. 2 shows a heating element geometry according to an embodiment of the invention with a spiral arrangement in the outer region.
Figure 3:
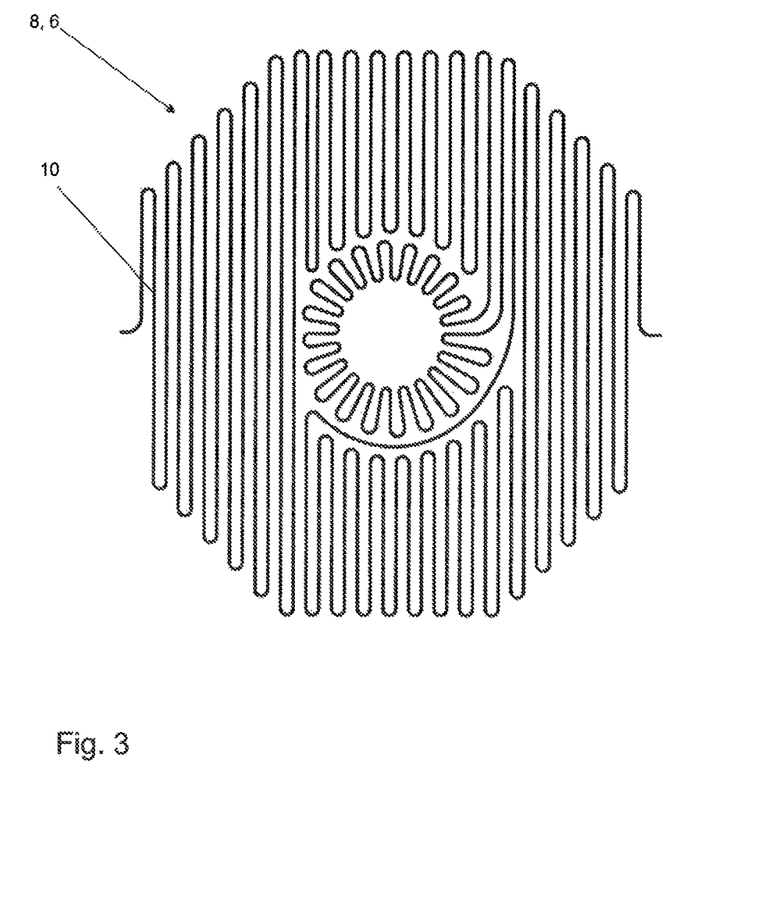
FIG. 3 shows a heating element geometry according to an embodiment of the invention with a meandering arrangement in the outer region.
Figure 4:
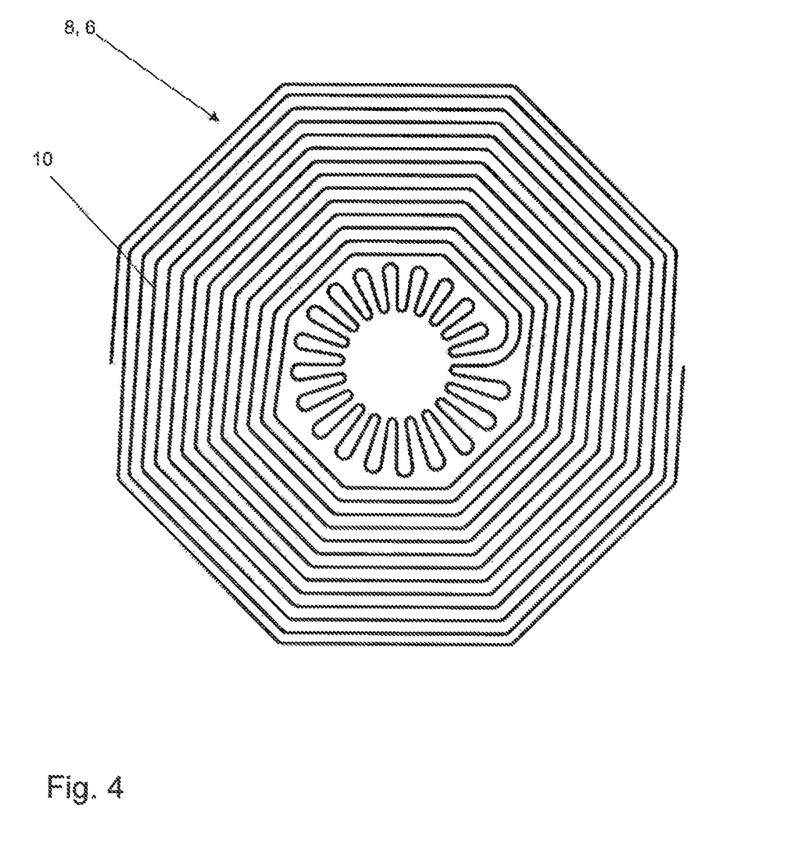
FIG. 4 shows a heating element geometry according to an embodiment of the invention with a polygonal arrangement in the outer region.

FIG. 2 shows a possible arrangement of a winding 8 of a heating element geometry 6. The winding is preferably formed by a continuous wire and preferably has no interruptions. The winding 8 has an inner and an outer winding region 9, 10, wherein these have a different arrangement. The inner winding region 9 has a meandering winding, wherein the meandering loops 12 are arranged along a circle concentric with the central axis 11. The loops 12 are preferably arranged in a regular manner along a circle extending concentrically with the central axis 11. The meandering loops 12 preferably have radially oriented winding sections 13, which are connected to one another at the ends thereof by arcs or radii 14. The inner arcs or radii 14 are all preferably at the same distance from the central axis 11. During the tapping operation, the drill 3 severs the inner winding region 9, preferably the winding sections 13, and the winding sections of the winding 8, 9 are preferably oriented at right angles to the drill, thereby making it possible to prevent the wire from unintentionally being pulled out during the tapping operation. The outer winding region 10 can be of different design. One embodiment of a heating element geometry 6 according to the invention, which has a spiral arrangement of the outer winding region 10, is illustrated in FIG. 2. FIGS. 3 and 4 show further possible arrangements of the outer winding region 10, wherein the wire extends in a meandering form in the outer winding region 10 in FIG. 3 and the wire of the outer winding region 10 is arranged in a polygonal shape in FIG. 4. Of course, other arrangements of the outer winding region or the shape of the wire thereof are also conceivable.

Figure 5:
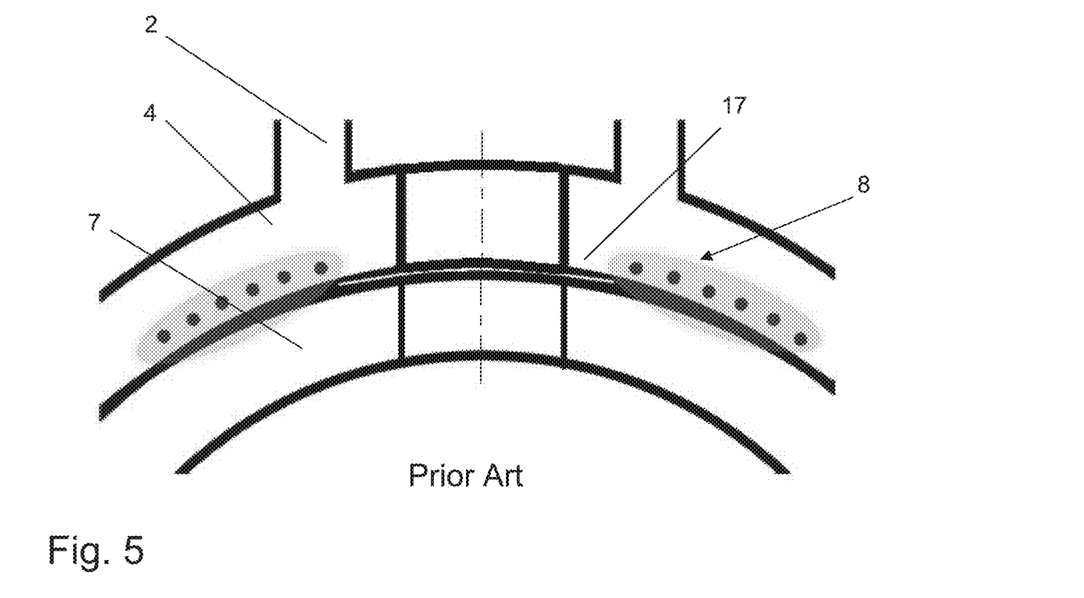
FIG. 5 shows a partial section through a tapping stub known from the prior art, welded and tapped.
Figure 6:
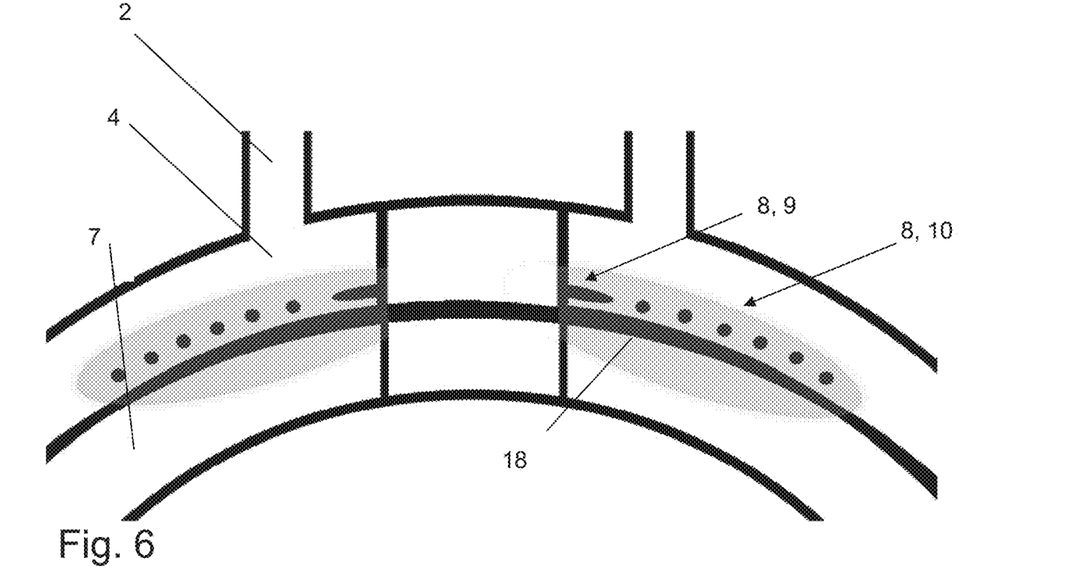
FIG. 6 shows a partial section through a tapping stub according to an embodiment of the invention, welding and tapped.

FIG. 5 and FIG. 6 show partial sections through tapping stubs 1, which have already been welded to the main pipe 7 and have already been tapped by means of a drill. FIG. 5 shows a tapping stub known from the prior art, on which it is readily apparent that a cold zone 17 is present directly at the drilled hole between the saddle piece 4 and the main pipe 7 and thus that detachment of the saddle piece 4 from the main pipe 7 can occur. FIG. 6 shows the tapping saddle 1 according to an embodiment of the invention, with a heating element geometry 6 according to an embodiment of the invention embedded in the saddle piece 4. It is readily apparent that the inner winding region 9 of the winding 8 has been severed by the drill, as a result of which there is a heating zone, not a cold zone, directly adjoining the drilled hole. This ensures good welding even directly in the rim region of the drilled hole or in the region of the saddle piece 4 in the inner region underneath the stub 2. Of course, the welding of the tapping stub 1 to the main pipe 7 is carried out before the tapping operation to ensure that the wire of the heating element geometry 6 is severed only after the welding process. It is readily apparent in FIG. 6 that the tapping fitting 1 has not become detached from the main pipe because a cold zone directly adjoining the drilled hole has been avoided.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

| LIST OF REFERENCE NUMERALS | |
|---|---|
| 1 | tapping fitting |
| 2 | stub |
| 3 | drill |
| 4 | saddle piece |
| 5 | inside diameter of saddle piece |
| 6 | heating element geometry |
| 7 | main pipe |
| 8 | winding |
| 9 | inner winding region |
| 10 | outer winding region |
| 11 | central axis |
| 12 | loop |
| 13 | winding section |
| 14 | arc, radius |
| 15 | internal thread |
| 16 | external thread |
| 17 | cold zone |
| 18 | welded zone |

What is claimed is:

1. A tapping saddle for a plastic main pipe carrying a medium, the tapping saddle comprising:
   a stub having a central axis;
   a saddle piece;
   a heating element having a winding including an outer winding region and an inner winding region, the heating element being arranged on an inner portion of the saddle piece; and
   a drill configured to be moved axially in the stub,
   wherein the heating element is used for welding the inner portion of the tapping saddle to an outer circumference of the main pipe,
   wherein in the inner winding region, the winding extends in meandering loops along a circle concentric with the central axis of the stub, and
   wherein the meandering loops are embedded in the saddle piece and project into a cross section formed by a projection of an inner wall of the stub onto a plane perpendicular to the central axis of the stub.

2. The tapping saddle according to claim 1, wherein the heating element geometry has a support material, wherein the winding is arranged on the support material.

3. The tapping saddle according to claim 1, wherein the meandering loops have radially extending winding sections that are arranged in series along a circle arranged concentrically with the central axis of the stub and are connected to one another by arcs.

4. The tapping saddle according to claim 3, wherein a cutting edge of the drill is configured to sever the meandering loops of the winding of the heating element.

5. The tapping saddle according to claim 3, wherein the radially extending winding sections of the meandering loops are oriented at right angles to a cutting edge of the drill or of a cut edge formed in the saddle piece.

6. The tapping saddle according to claim 3, wherein each of the radially extending winding sections of the meandering loops is linear and extends along a line that passes through a center of the circle arranged concentrically with the central axis of the stub.

7. The tapping saddle according to claim 6, wherein, when projected onto the plane perpendicular to the central axis of the stub, each of the radially extending winding sections of the meandering loops forms a line that intersects the projection of the inner wall of the stub onto the plane perpendicular to the central axis of the stub.

8. The tapping saddle according to claim 7, wherein the winding of the outer winding region forms circles that are concentric with the central axis of the stub.

9. The tapping saddle according to claim 1, wherein the winding of the outer winding region extends in a spiral shape, polygonal shape or meandering shape.

10. The tapping saddle according to claim 1, wherein the drill is configured to sever, when tapping the main pipe and the saddle piece, the winding of the heating element in the inner winding region or the meandering loops.

11. The tapping saddle according to claim 1, wherein the stub has an internal thread.

12. The tapping saddle according to claim 1, wherein the drill is arranged in the stub and is configured to be moved by an external thread arranged on the drill.

13. The tapping saddle according to claim 1, wherein the winding is made of wire.

14. A heating element for use in a tapping saddle, the heating element comprising:
  a winding having an outer winding region and an inner winding region,
  wherein in the inner winding region, the winding extends in meandering loops along a circle concentric with a central axis of a stub of the tapping saddle,
  wherein the meandering loops include:
    a plurality of inner arcs, each of the inner arcs disposed within a first region extending between a first circle at a first radial distance from the central axis of the stub and a second circle at a second radial distance from the central axis of the stub, the second radial distance being greater than the first radial distance,
    a plurality of outer arcs, each of the outer arcs disposed within a second region extending between a third circle at a third radial distance from the central axis of the stub and a fourth circle at a fourth radial distance from the central axis of the stub, the third radial distance being greater than the second radial distance and the fourth radial distance being greater than the third radial distance, and
    a plurality of radially extending winding sections, each respective radially extending winding section connecting a respective inner arc to a respective outer arc, wherein each respective radially extending winding section extends linearly from the second circle to the third circle in a radial direction parallel to a diameter of the third circle,
  wherein each of the first circle, the second circle, the third circle, and the fourth circle are arranged concentrically with the central axis of the stub.

15. The heating element according to claim 14, further comprising a support material, wherein the winding is arranged on the support material.

16. The heating element according to claim 15, wherein the winding is stitched to the support material.

17. The heating element according to claim 14, wherein the winding is secured in a saddle piece of the tapping saddle.

18. The heating element geometry according to claim 14, wherein the winding is made of wire.

19. A method for tapping a plastic main pipe carrying a medium, the method comprising:
  positioning a tapping saddle on an outer circumference of the main pipe, the tapping saddle having a saddle piece and a stub, the stub having a central axis;
  welding the tapping saddle to the outer circumference of the main pipe through the use of a heating element arranged in the saddle piece; and
  tapping the main pipe by drilling through a saddle piece of the tapping saddle with a drill,
  wherein drilling through the saddle piece of the tapping saddle includes drilling through an inner winding region of a winding of the heating element arranged in the saddle piece,
  wherein, when drilling through the inner winding region of the winding of the heating element, a cutting edge of the drill severs meandering loops of the winding that are formed in the inner winding region, and
  wherein the meandering loops are embedded in the saddle piece and project into a cross section formed by a projection of an inner wall of the stub onto a plane perpendicular to the central axis of the stub.

* * * * *